United States Patent
Kang et al.

(10) Patent No.: US 10,257,540 B2
(45) Date of Patent: *Apr. 9, 2019

(54) VIDEO ENCODING AND DECODING METHOD AND APPARATUS USING THE SAME

(71) Applicants: Electronics and Telecommunications Research Institute, Daejeon (KR); INDUSTRY-ACADEMIC COOPERATION GROUP OF SEJONG UNIVERSITY, Seoul (KR)

(72) Inventors: Jung Won Kang, Daejeon-si (KR); Ha Hyun Lee, Seoul (KR); Jin Ho Lee, Daejeon-si (KR); Jin Soo Choi, Daejeon-si (KR); Jin Woong Kim, Daejeon-si (KR); Jong Ki Han, Seoul (KR); Jae Yung Lee, Seoul (KR)

(73) Assignees: Electronics and Telecommunications Research Institute, Daejeon (KR); Industry-Academic Cooperation Group Of Sejong University, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,662

(22) Filed: Jan. 24, 2018

(65) Prior Publication Data
US 2018/0152729 A1 May 31, 2018

Related U.S. Application Data

(63) Continuation of application No. 15/483,124, filed on Apr. 10, 2017, now Pat. No. 9,924,198, which is a
(Continued)

(30) Foreign Application Priority Data

Dec. 28, 2012 (KR) .................. 10-2012-0156373
Dec. 27, 2013 (KR) .................. 10-2013-0165800

(51) Int. Cl.
*H04N 19/154* (2014.01)
*H04N 19/124* (2014.01)
(Continued)

(52) U.S. Cl.
CPC ......... *H04N 19/597* (2014.11); *H04N 19/105* (2014.11); *H04N 19/31* (2014.11);
(Continued)

(58) Field of Classification Search
CPC .... H04N 19/597; H04N 19/105; H04N 19/31; H04N 19/70; H04N 19/172;
(Continued)

(56) References Cited

U.S. PATENT DOCUMENTS

2009/0279612 A1  11/2009  Pandit et al.
2014/0010291 A1*  1/2014  He ..................... H04N 19/50
                                                   375/240.12
2014/0198850 A1   7/2014  Choi et al.

FOREIGN PATENT DOCUMENTS

KR   10-2013-0018628 A    2/2013

* cited by examiner

*Primary Examiner* — Hee-Yong Kim
(74) *Attorney, Agent, or Firm* — NSIP Law (57) ABSTRACT

The present invention is related to a method for moving the position of a base view from an arbitrary GOP (Group Of Pictures) start position to implement an efficient encoding structure in multi-view video encoding. The existing multi-view video encoding method exhibits low encoding efficiency when correlation between the base view and a dependent view is low, since the base view is assumed to be fixed. Moreover, in case the view in a live broadcasting program desired by a producer changes from the base view to another, the user has to consume more bit streams and decoder complexity than those consumed when decoding is performed with respect to the base view. Therefore, to alleviate the drawbacks of the existing multi-view video encoding method, the present invention provides a method for designing syntax elements by which the base view can be moved, thereby supporting an efficient encoding structure.

9 Claims, 7 Drawing Sheets

Related U.S. Application Data continuation of application No. 14/141,685, filed on Dec. 27, 2013, now Pat. No. 9,693,055.

(51) Int. Cl.
| | | |
|---|---|---|
| *H04N 19/597* | (2014.01) | |
| *H04N 19/105* | (2014.01) | |
| *H04N 19/70* | (2014.01) | |
| *H04N 19/31* | (2014.01) | |
| *H04N 19/177* | (2014.01) | |
| *H04N 19/172* | (2014.01) | |
| *H04N 19/174* | (2014.01) | |
| *H04N 19/176* | (2014.01) | |
| *H04N 19/184* | (2014.01) | |

(52) U.S. Cl.
CPC ........... *H04N 19/70* (2014.11); *H04N 19/172* (2014.11); *H04N 19/174* (2014.11); *H04N 19/176* (2014.11); *H04N 19/177* (2014.11); *H04N 19/184* (2014.11)

(58) Field of Classification Search
CPC .. H04N 19/174; H04N 19/176; H04N 19/177; H04N 19/184
USPC ..................................... 375/240.25
See application file for complete search history.

| RefPicSet LtCurr | RefPicSet LtFoll | RefPicSet StCurr Before | RefPicSet StCurr After | RefPicSet StFoll | RefPicSet IvCurr |

VIDEO ENCODING AND DECODING METHOD AND APPARATUS USING THE SAME

CROSS-REFERENCE TO RELATED APPLICATIONS

This application is a Continuation of U.S. application Ser. No. 15/483,124, filed on Apr. 10, 2017, now U.S. Pat. No. 9,924,198, issued on Mar. 20, 2018, which is a Continuation of U.S. application Ser. No. 14/141,685, filed on Dec. 27, 2013, now U.S. Pat. No. 9,693,055, issued on Jun. 27, 2017, which claims the benefit of priority of Korean Patent Application No. 10-2012-0156373 filed on Dec. 28, 2012 and Korean Patent Application No. 10-2013-0165800 filed on Dec. 27, 2013, all of which are incorporated by reference in their entirety herein.

BACKGROUND OF THE INVENTION

Field of the Invention

The present invention is related to image encoding and decoding and more particularly, a method for changing a base view in multi-view video encoding and apparatus using the method.

Discussion of the Related Art

As broadcasting services provided in HD resolution are spread globally, more people are getting used to high resolution, high quality images, and many organizations are accelerating development of next-generation image devices. In addition to HDTVs, public attention to UHD (Ultra High Definition) TVs, which provide videos in a resolution more than four times the resolution of HDTV, is increasing; thus, demand for a technology capable of compressing images of higher resolution and higher quality is getting larger.

To implement image compression, various technologies can be employed, including: inter-prediction technology estimating pixel values in a current picture by using the pictures located temporally before and/or after the current picture, intra-prediction technology estimating pixel values of a current picture by using pixel information of the current picture, and entropy coding technology assigning short code words to frequently appearing symbols but longer code words to those symbols appearing in low frequency.

There are various kinds of image compression technologies, one of which provides constant network bandwidth in an operating environment constrained by limited hardware resources, not taking account of dynamic network environments. In order to deal with compression of image data in a network environment where bandwidth changes constantly, however, a new compression technology is highly required, and in this regard, a scalable video encoding/decoding method is an attractive solution.

SUMMARY OF THE INVENTION

The present invention provides a method for moving the position of a base view from an arbitrary GOP (Group Of Pictures) start position to implement an efficient encoding structure in multi-view video encoding and an apparatus using the method.

The existing multi-view video encoding method exhibits low encoding efficiency when correlation between the base view and a dependent view is low, since the base view is assumed to be fixed. Moreover, in case the view in a live broadcasting program desired by a producer changes from the base view to another, the user has to consume more bit streams and decoder complexity than those consumed when decoding is performed with respect to the base view. Therefore, to alleviate the drawbacks of the existing multi-view video encoding method, the present invention provides a method for designing syntax elements by which the base view can be moved and an apparatus using the method.

Accordingly, the present invention provides a method for supporting an efficient encoding structure and increasing encoding efficiency; and an apparatus using the method.

The present invention provides a method for the user to decode the view intended by a producer in a more cost-effective way than existing methods in case the view is moved in a live broadcasting program according to the producer's intention and an apparatus using the method.

According to one aspect of the present invention, a method for multi-view video decoding is provided. The method for multi-view video decoding comprises deriving layer dependency from a plurality of layers; in case a base view is moved, reconfiguring layer IDs for identifying layers and a view order in accordance with movement of the base view; and based on reconfigured layer IDs, constructing a reference picture list that a current picture references.

The layer dependency can be composed of at least one reference layer set including the number of reference layers which the current layer references and identifying information of the reference layer.

According to another aspect of the present invention, a method for multi-view video encoding is provided. The method for multi-view video encoding comprises deriving layer dependency from a plurality of layers; in case a base view is moved, reconfiguring layer IDs for identifying layers and a view order in accordance with movement of the base view; and based on reconfigured layer IDs, constructing a reference picture list that a current picture references.

The layer dependency can be composed of at least one reference layer set including the number of reference layers which the current layer references and identifying information of the reference layer.

According to a yet another aspect of the present invention, an apparatus for multi-view video decoding is provided. The apparatus for multi-view video decoding comprises deriving layer dependency from a plurality of layers; in case a base view is moved, reconfiguring layer IDs for identifying layers and a view order in accordance with movement of the base view; and based on reconfigured layer IDs, constructing a reference picture list that a current picture references.

The layer dependency can be composed of at least one reference layer set including the number of reference layers which the current layer references and identifying information of the reference layer.

According to one aspect of the present invention, an apparatus for multi-view video encoding is provided. The apparatus for multi-view video encoding comprises deriving layer dependency from a plurality of layers; in case a base view is moved, reconfiguring layer IDs for identifying layers and a view order in accordance with movement of the base view; and based on reconfigured layer IDs, constructing a reference picture list that a current video references.

The layer dependency can be composed of at least one reference layer set including the number of reference layers which the current layer references and identifying information of the reference layer.

According to one embodiment of the present invention, a method for moving the position of a base view from an arbitrary GOP start position to implement an efficient encoding structure in multi-view video encoding and an apparatus using the method are provided.

The existing multi-view video encoding method exhibits low encoding efficiency when correlation between the base view and a dependent view is low, since the base view is assumed to be fixed. Moreover, in case the view in a live broadcasting program desired by a producer changes from the base view to another, the user has to consume more bit streams and decoder complexity than those consumed when decoding is performed with respect to the base view. Therefore, to alleviate the drawbacks of the existing multi-view video encoding method, one embodiment of the present invention provides a method for designing syntax elements by which the base view can be moved and an apparatus using the method.

Accordingly, the present invention provides an image encoding/decoding method for supporting an efficient encoding structure and an apparatus using the method.

BRIEF DESCRIPTION OF THE DRAWINGS

The accompanying drawings, which are included to provide a further understanding of the present invention and constitute a part of specifications of the present invention, illustrate embodiments of the present invention and together with the corresponding descriptions serve to explain the principles of the present invention.

DETAILED DESCRIPTION OF THE INVENTION

In what follows, embodiments of the present invention will be described in detail with reference to appended drawings. In describing embodiments of the present invention, if it is determined that detailed description of a related structure or function known for those in the art obscures the technical principles of the present invention, the corresponding description will be omitted.

If a component is said to be "linked" or "connected" to a different component, the component may be directly linked or connected to the different component, but a third component may exist to connect the two components. On the other hand, if a particular structure is said to be "included" in this document, it is not meant to exclude a structure other than the corresponding structure; rather, inclusion of the corresponding structure indicates that additional structures can be included in the embodiments or technical scope of the present invention.

Terms such as first and second can be used for describing various structures but the structures should not be limited by the terms. The terms are introduced only for the purpose of distinguishing one structure from the others. For example, a first structure may be called a second structure without departing from the scope of the present invention and vice versa.

Also, constituting units introduced in the embodiments of the present invention are described separately from each other to emphasize the distinctive functions thereof; it does not indicate that each constituting unit should be implemented by separate hardware or single software element. In other words, each constituting unit is described in its present form for the sake of convenience; at least two constituting units may comprise one constituting unit, or one constituting unit may be divided into multiple constituting units to perform a function. Both Integrated and separate embodiments of individual constituting units belong to the technical scope of the present invention as long as they do not depart from the technical principles of the present invention.

Also, part of constituting elements may not be mandatory elements carrying out essential functions of the present invention, but may be introduced as optional elements only to improve performance. The present invention can be realized by using only the mandatory elements needed to implement the technical principles of the present invention without employing the optional elements introduced only for performance enhancement, and a structure comprising only mandatory elements excluding optional ones used only for improving performance also belongs to the technical scope of the present invention.

Figure 1:
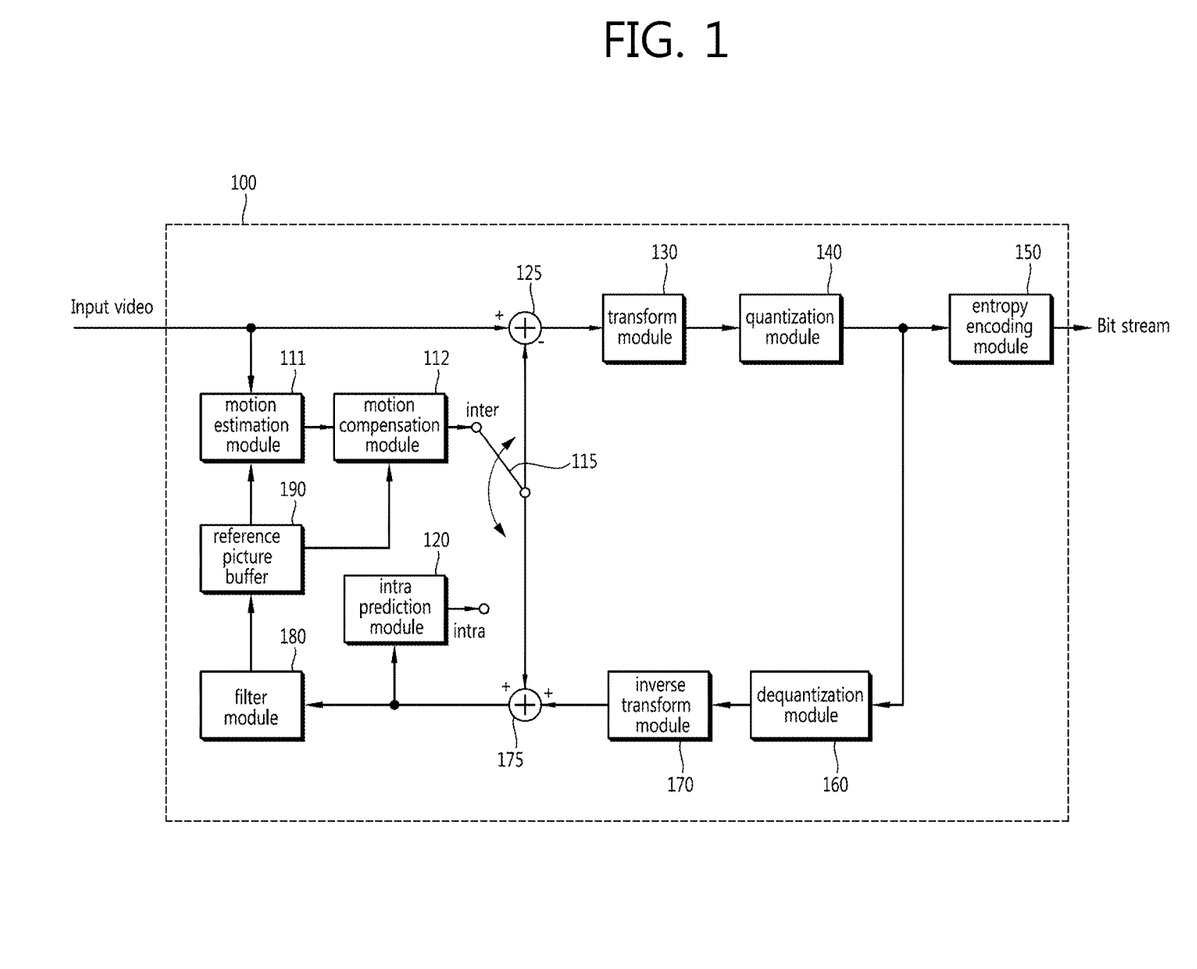
FIG. 1 is a block diagram illustrating the structure of an apparatus for video encoding according to one embodiment of the present invention.

FIG. 1 is a block diagram illustrating the structure of an apparatus for video encoding according to one embodiment of the present invention. A method or apparatus for scalable video encoding/decoding can be implemented by extension of a conventional method or apparatus for video encoding/decoding not providing multi-view videos, and the block diagram of FIG. 1 illustrates one embodiment of an apparatus for video encoding which can be a base of an apparatus for multi-view video encoding.

With reference to FIG. 1, the apparatus for video encoding 100 comprises a motion prediction module 111, motion compensation module 112, intra-prediction module 120, switch 115, subtractor 125, transformation module 130, quantization module 140, entropy encoding module 150, inverse quantization module 160, inverse transformation module 170, adder 175, filter 180, and reference picture buffer 190.

The apparatus for video encoding 100 can perform encoding of input pictures in the intra or inter mode and produce bit streams. Intra-prediction denotes in-picture prediction, while inter-prediction denotes inter-picture prediction. In the case of intra mode, the switch 115 is switched to intra mode, while in the case of inter mode, the switch 115 is switched to inter mode. The apparatus for video encoding 100 generates prediction blocks for input blocks of an input picture and encodes residuals between input blocks and prediction blocks.

In the case of intra mode, the intra-prediction module 120 performs spatial prediction by using pixel values of already encoded/decoded blocks around a current block and generates prediction blocks.

In the case of inter mode, during a motion prediction process, the motion prediction module 111 searches reference pictures stored in the reference picture buffer 190 for a region that best matches the input block and obtains a motion vector. The motion compensation module 112 can generate prediction blocks by carrying out motion compensation by using the motion vector and reference picture stored in the reference picture buffer 190.

The subtractor 125 can generate residual blocks from residuals between input blocks and generated prediction blocks. The transformation module 130 transforms residual blocks and produces transform coefficients. And the quantization module 140 quantizes input transform coefficients according to quantization parameters and produces quantized coefficients.

The entropy encoding module 150 performs entropy encoding on symbols according to a probability distribution based on the values calculated from the quantization module 140 or encoding parameters calculated from an encoding process and produces bit streams. An entropy encoding method receives symbols taking various values and removes statistical redundancy, representing the symbols as a decodable binary number.

Here, a symbol denotes a syntax element to be encoded or decoded, coding parameter, residual signal, and so on. A coding parameter is a parameter required for encoding and decoding; and includes not only the information encoded in an encoding apparatus and transmitted to a decoding apparatus, such as the syntax element but also the information inferred during an encoding or decoding process. The coding parameter denotes the information required for encoding or decoding pictures. The coding parameter, for example, can include inter or inter prediction mode, movement or motion vector, reference picture index, coding block pattern, existence of residual signals, transform coefficients, quantized transform coefficients, quantized parameters, block size, and block segmentation information; or statistical equivalents thereof. Also, a residual signal may denote a difference between the original signal and prediction signal, a signal representing transformation of a difference between the original signal and prediction signal, or a signal representing transformation and quantization of a difference between the original signal and prediction signal. The residual signal may be called a residual block if interpreted in units of blocks.

In case entropy encoding is applied, a small number of bits are allocated to a symbol with a high probability of occurrence while a large number of bits are allocated to a symbol with a low probability of occurrence; thus, the size of bit streams for target symbols to be encoded can be reduced. Therefore, compression performance of video encoding can be improved through entropy encoding.

Encoding methods such as Exponential-Golomb, CAVLC (Context-Adaptive Variable Length Coding), and CABAC (Context-Adaptive Binary Arithmetic Coding) can be used for entropy encoding. For example, the entropy encoding module 150 can store a table used for carrying out entropy encoding, such as a variable length coding/code (VLC) table and perform entropy encoding by using the stored VLC table. Also, after deriving a binarization method for target symbols and a probability model of the target symbols or bins, the entropy encoding module 150 can perform entropy encoding by using the derived binarization method or probability model.

The quantized coefficients are inversely quantized by the inverse quantization module 160 and inversely transformed by the inverse transformation module 170. The inversely quantized, inversely transformed coefficients are added to prediction blocks through the adder 175, and reconstructed blocks are generated.

The reconstructed block passes through the filter 180, and the filter 180 can apply at least one or more of deblocking filter, SAO (Sample Adaptive Offset), and ALF (Adaptive Loop Filter) to the reconstructed block or reconstructed picture. The filter 180 may be called an adaptive in-loop filter. Reconstructed blocks which have passed through the filter 180 can be stored in the reference picture buffer 190.

Figure 2:
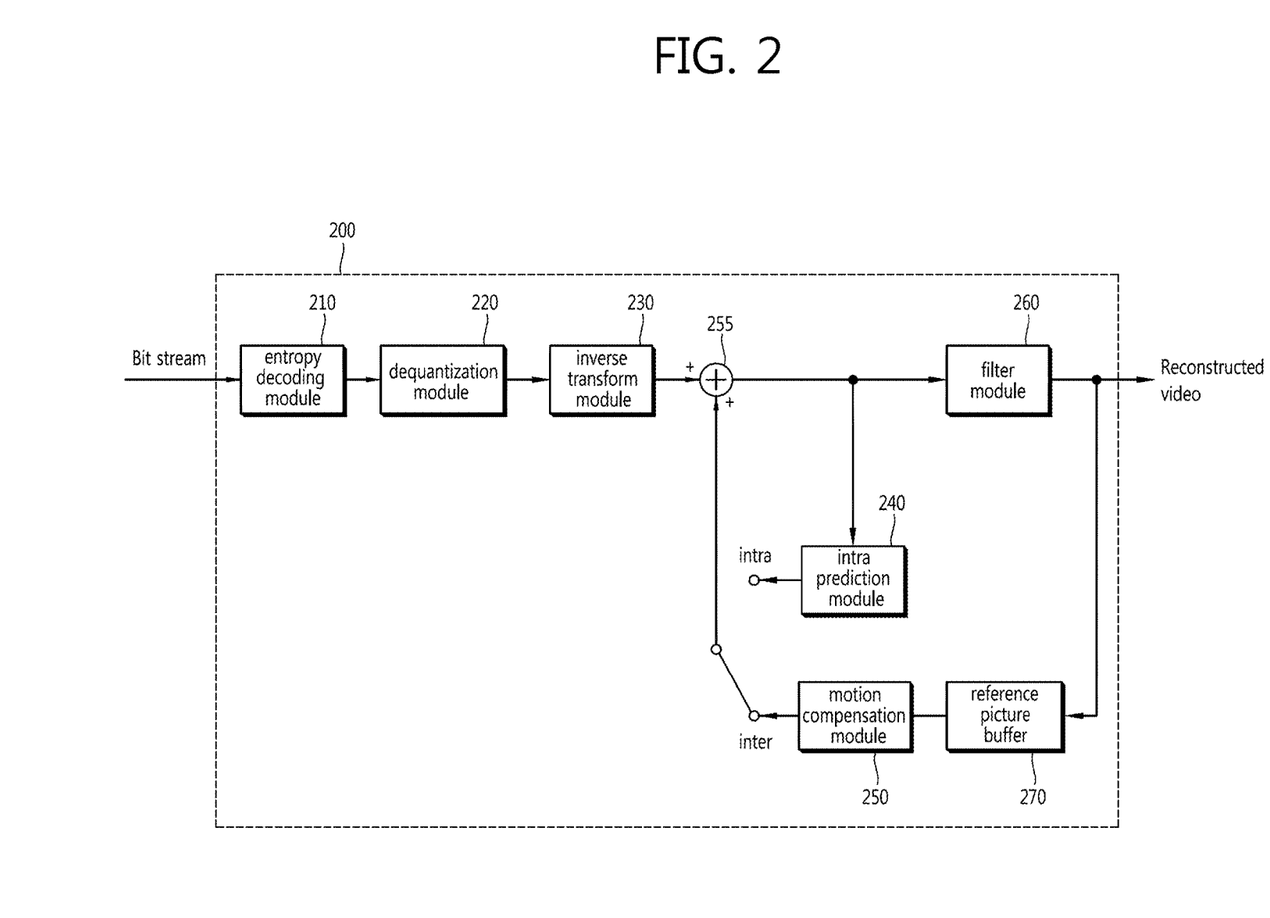
FIG. 2 is a block diagram illustrating the structure of an apparatus for video decoding according to one embodiment of the present invention.

FIG. 2 is a block diagram illustrating the structure of an apparatus for video decoding according to one embodiment of the present invention. As described in detail with reference to FIG. 1, a method or apparatus for multi-view video encoding/decoding can be implemented by extension of a conventional method or apparatus for video encoding/decoding not providing multi-view video, and the block diagram of FIG. 2 illustrates one embodiment of an apparatus for video decoding which can be a base of an apparatus for multi-view video decoding.

With reference to FIG. 2, the apparatus for video decoding 200 comprises an entropy decoding module 210, inverse quantization module 220, inverse transformation module 230, intra-prediction module 240, motion compensation module 250, filter 260, and reference picture buffer 270.

The apparatus for video decoding 200 receives a bit stream output from the encoder, performs decoding in the intra or inter mode, and produces a restructured picture, namely reconstructed picture. In the case of intra mode, the switch is switched to intra mode, while in the case of inter mode, the switch is switched to inter mode. The apparatus for video decoding 200 obtains reconstructed residual blocks from the received bit streams, generates prediction blocks, and generates restructured blocks, namely reconstructed blocks by combining the reconstructed residual blocks and the prediction blocks.

The entropy decoding module 210 can perform entropy decoding of received bit streams according to the probability distribution thereof and generate symbols including symbols in the form of a quantized coefficient. An entropy decoding method receives binary sequences and generates symbols therefrom. The entropy decoding method is similar to the entropy encoding method described above.

Quantized coefficients are inversely quantized by the inverse quantization module 220 and inversely transformed by the inverse transformation module 230; as the quantized coefficients are inversely quantized/transformed, reconstructed residual blocks can be generated.

In the case of intra mode, the intra-prediction module 240 performs spatial prediction by using pixel values of already decoded blocks around a current block and generates prediction blocks. In the case of inter mode, the motion compensation module 250 can generate prediction blocks by performing motion compensation by using motion vectors and reference pictures stored in the reference picture buffer 270.

Reconstructed residual blocks and prediction blocks are combined by the adder 255, and the added blocks may pass through the filter 260. The filter 260 can apply at least one or more of deblocking filter, SAO, and ALF to the reconstructed block or reconstructed picture. The filter 260 produces a restructured picture, namely reconstructed picture. The reconstructed picture, being stored in the reference picture buffer 270, can be used for inter-prediction.

From among the entropy decoding module 210, inverse quantization module 220, inverse transformation module 230, intra-prediction module 240, motion compensation module 250, filter 260, and reference picture buffer 270 included in the apparatus for video decoding 200, constituting elements related directly to decoding of video—for example, entropy decoding module 210, inverse quantization module 220, inverse transformation module 230, intra-prediction module 240, motion compensation module 250, and filter 260—can be called a decoding unit separately from other constituting elements.

Also, the apparatus for video decoding 200 can further comprise a parsing unit (not shown) which parses information related to encoded video included in bit streams. The parsing unit may include the entropy decoding module 210, or vice versa. The parsing unit can also be implemented in the form of one constituting element of the decoding unit.

Figure 3:
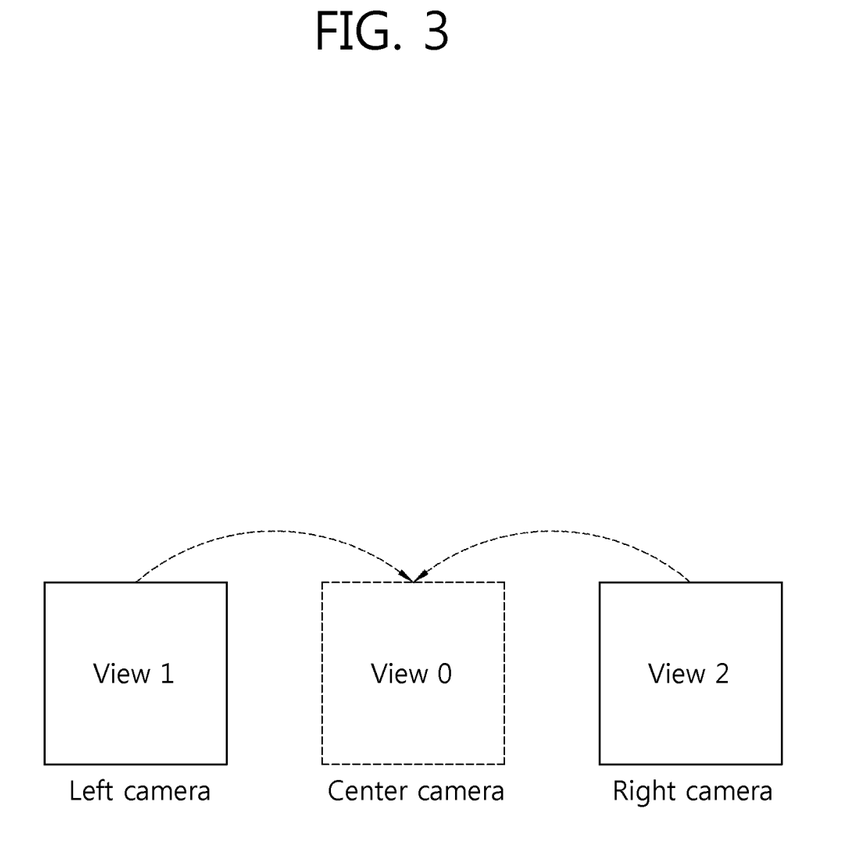
FIG. 3 is a conceptual drawing illustrating one embodiment of a multi-view based video coding structure to which the present invention can be applied.

FIG. 3 is a conceptual drawing illustrating one embodiment of a multi-view based video coding structure to which the present invention can be applied.

In FIG. 3, View 1 represents a picture obtained by a camera positioned to the left of View 0, while View 2 represents a picture obtained by a camera positioned to the right of the View 0.

Also, the View 1 and View 2 are used for inter-view prediction by making use of the View 0 as a reference picture, and to this end, the View 0 has to be encoded first before the View 1 and View 2.

Since the View 0 can be encoded independently of the other Views, it is called an independent view or a base view. On the other hand, the View 1 and View 2 are called a dependent view since the View 1 and View 2 use the View 0 as a reference picture.

An independent view can be encoded by using conventional two-dimensional video codec. Dependent views, however, needs inter-view prediction and can be encoded by using three-dimensional video codec including an inter-view prediction process.

In the case of encoding and decoding of a multi-view video in a bit stream, namely multi-view video coding, multiple views are strongly correlated with each other; thus, if prediction is performed on the basis of the correlation, data redundancy can be removed, and performance of video encoding can be improved. Hereinafter, prediction of a current layer, which is the prediction target, based on the information of other views can be called inter-view prediction. In what follows, multi-view video coding conveys the same meaning as multi-view video encoding from the viewpoint of encoding, while the multi-view video coding can be interpreted as multi-view video decoding from the viewpoint of decoding.

Multiple views may differ from each other at least in terms of resolution, frame rate, and color format; at the time of inter-view prediction, up-sampling or down-sampling can be carried out for adjustment of resolution.

The multi-view coding method as described above can remove inter-layer redundancy by using inter-view texture information, inter-view motion information, residual signals, and so on, thereby increasing encoding/decoding performance.

The conventional multi-view video encoding relies on a fixed base view. In case correlation between the base view and a dependent view becomes low, however, encoding efficiency may be degraded.

Moreover, in case viewpoints in a live broadcasting program are changed according to the intention of a producer, to decode the video of particular views intended by the producer, the user has to decode more bit streams than the case of decoding base view pictures, and at the same time, complexity of the decoder is increased.

Accordingly, the present invention introduces high-level syntax, with which position of a base view can be changed in units of GOP (Group Of Pictures) in multi-view video encoding, and introduces new inter-layer dependency to change inter-layer dependency, namely inter-view dependency in an efficient manner. Through the introduction of a new design as above, the present invention attempts to support an efficient encoding structure for multi-view video encoding.

The present invention provides a method for the user to decode the view intended by a producer in a more cost-effective way than existing methods in case the view is moved in a live broadcasting program according to the producer's intention and an apparatus using the method.

The following describe a decoding order and management of reference pictures in the conventional multi-view videos.

First, inter-layer reference pictures are managed by inter-layer dependency determined in a video parameter set (hereinafter, VPS) extension.

The decoding apparatus analyzes view_id[i] from the VPS extension, informing which layer corresponds to which view. The index i has a range as large as the total number of layers.

Next, the decoding apparatus analyzes num_direct_ref_layers[layerID] from the VPS extension, informing how many layers each layer references, and analyzes ref_layer_id[i] informing of which layers each layer references.

Through the above analysis, the decoding apparatus can figure out inter-layer dependency for each layer. In other words, it can be known that layers of which view are referenced by which layer.

Meanwhile, the layer_id of the base view is always set to '0', and the view_id of the base view is also set to '0'.

In ref_layer_id[i], i can have a value ranging from '0' to the value specified by num_direct_ref_layers which informs how many layers each layer references.

After analyzing a current view of each layer, the decoding apparatus parses and analyzes view_order_Idx[i] which represents the encoding/decoding order at the time of signaling being included in a sequence parameter set (hereinafter, SPS). At this time, i can have a value as large as the number of total views.

Figure 4:
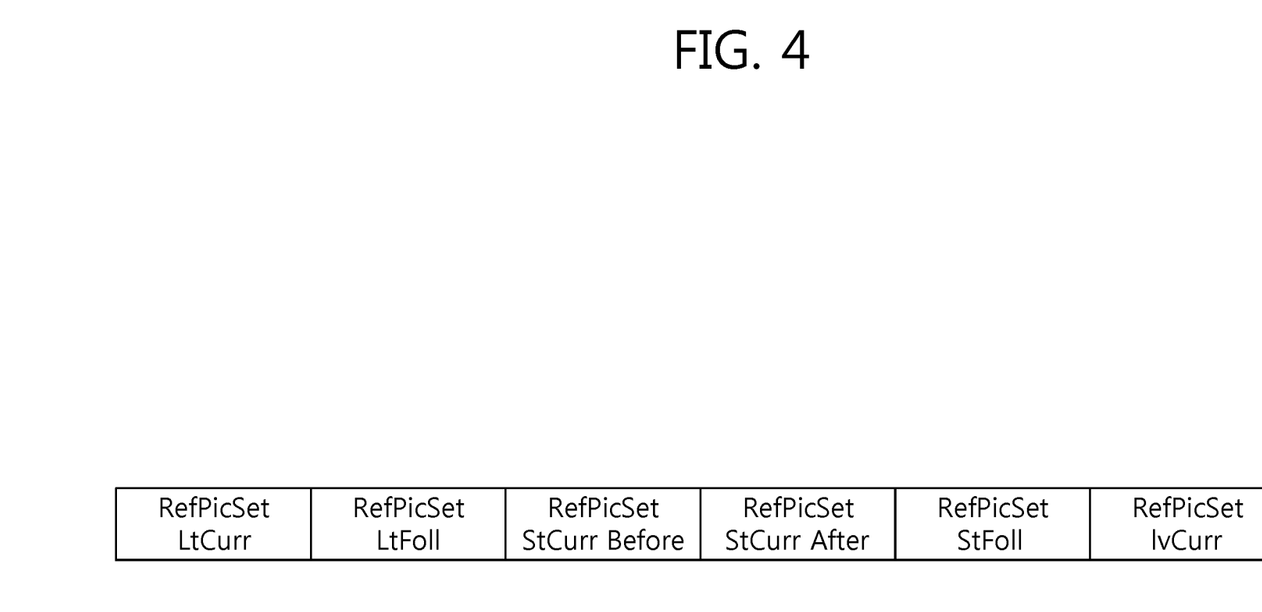
FIG. 4 illustrates the structure of a reference picture list for multi-view video.

Once analysis about layers referenced by each layer is completed, the decoding apparatus adds RefPicSetIvCurr to the reference picture list as shown in FIG. 4.

FIG. 4 illustrates the structure of a reference picture list for multi-view videos. With reference to FIG. 4, a reference picture list can comprise a long-term reference picture set referenced by a current picture (RefPicSetLtCurr), long-term reference picture set not referenced by the current picture (RefPicSetLtFoll), forward direction short-term reference picture set referenced by the current picture (RefPicSetStCurrBefore), inverse direction short-term reference picture set referenced by the current picture (RefPicSetStCurrAfter), short-term reference picture set not referenced by the current picture (Ref PicSetStFoll), and inter-view reference picture set referenced by the current picture (Ref PicSetIvCurr).

The reference picture set (RefPicSetivCurr) can include as many reference layers as the number of num_direct_ref_layers signaled from the VPS extension.

The inter-view reference picture set (RefPicSetivCurr) can include a picture having the same layer identifier (layer_id) as the ref_layer_id[i] signaled from the VPS extension and having the same POC (Picture Order Count) as the current picture.

Those pictures comprising the inter-view reference picture set (RefPicSetivCurr) are all marked as "used for long-term reference".

In what follows, a method for moving a base view in multi-view video encoding according to the present invention will be described.

Figure 5:
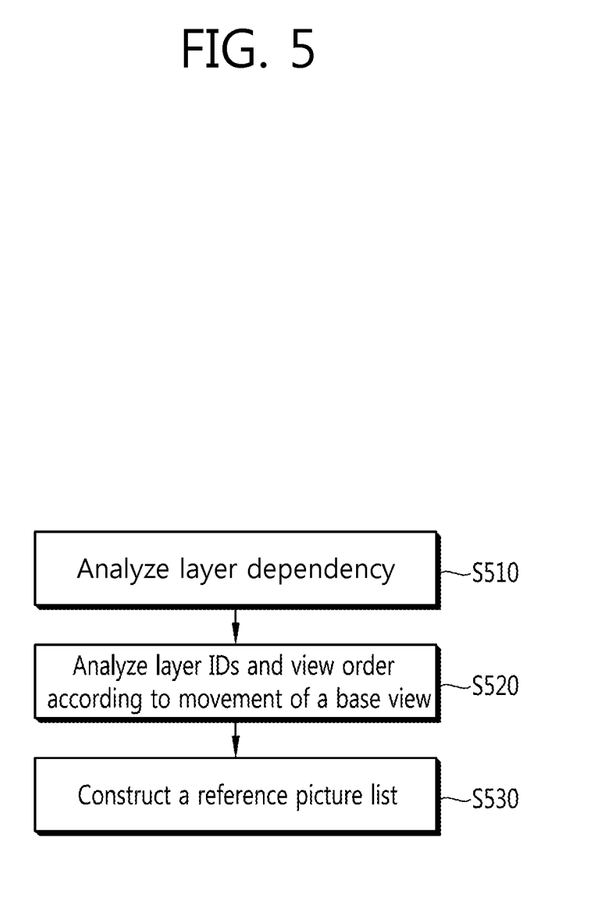
FIG. 5 is a flow diagram illustrating a method for moving a base view in multi-view video encoding according to the present invention.

FIG. 5 is a flow diagram illustrating a method for moving a base view in multi-view video encoding according to the present invention.

First of all, the encoder and decoder analyze layer dependency S510.

Analyzing layer dependency indicates determining layer dependency for encoding or decoding, which can be regarded as a step of managing reference pictures to use pictures of other layers as reference pictures of a current layer during the process of encoding and decoding pictures.

Layer dependency can be analyzed through the VPS extension of video and also through individual slices.

First, from the viewpoint of the encoder, at the time of encoding layer dependency by using the VPS extension, the encoder can encode layer dependency by using only an existing method or by using either of the method for encoding the existing layer dependency and the method for predefining sets consisting of the number of reference layers referenced by a current layer and layer_ids (scalable reference layer sets, SRLSs) and using a desired one from among the sets.

In case only the method for encoding an existing layer dependency is used, the encoder can encode layer dependency by using the existing method described with reference to FIG. 4.

Similarly, in case the existing method and SRLS are employed, the encoder can encode a flag informing of which method has been used (for example, vps_srls_present_flag).

In case the existing method is used to encode layer dependency, the existing syntax is encoded and transmitted. On the other hand, in case the SRLS is employed, the syntax informing of how many layer dependency sets (SRLSs) to use (num_scalable_ref_layer_sets) is encoded and transmitted, while the content of each set, namely reference pictures comprising the set are encoded in scalable_ref_layer_set( ) and transmitted.

Meanwhile, in case the encoder performs encoding by using the existing method for representing layer dependency, the decoder can decode layer dependency according to the existing method without change of syntax.

Similarly, in case either of the existing encoding method and SRLS is used to encode layer dependency, the decoder can decode syntax elements as shown in Table 1.

TABLE 1

| vps_extension( ) { | Descriptor |
|---|---|
|   while( !byte_aligned( ) ) | |
|     vps_extension_byte_alignment_reserved_one_bit | u(1) |
|   avc_base_codec_flag | u(1) |
|   scalability_mask | u(16) |
|   for(i=0; i<NumScalabilityTypes; i++){ | |
|     dimension_id_len_minus1[ i ] | u(3) |
|   } | |
|   vps_nuh_layer_id_present_flag | u(1) |
|   //layer specific information | |
|   for(i=1; i<=vps_max_layers_minus1; i++){ | |
|     // mapping of layer ID to scalability dimension IDs | |
|     if( vps_nuh_layer_id_present_flag ) | |
|       layer_id_in_nuh[ i ] | u(6) |
|     for(j=0, j<=num_dimensions_minus1; j++) | |
|       dimension_id[ i ][ j ] | u(v) |
|   } | |
|   for(i=1; i<=vps_max_layers_minus1; i++){ | |
|     profile_tier_level( 1, vps_max_sub_layers_minus1 ) | |
|   vps_srls_present_flag | u(1) |
|   if(vps_srls_present_flag){ | |
|     num_scalable_ref_layer_sets | ue(v) |
|     for(i=0 ; i< num_scalable_ref_layer_sets ; i++) | |
|       scalable_ref_layer_set(i) | |
|   } | |

TABLE 1-continued

| else{ | |
|---|---|
|   for(i=1; i<=vps_max_layers_minus1; i++){ | |
|   // layer dependency | |
|     num_direct_ref_layers[ i ] | u(6) |
|     for(j=0, j<num_direct_ref_layers [ i ]; j++) | |
|       ref_layer_id[ i ][ j ] | u(6) |
|   } | |
| } | |
| } | |

With reference to Table 1, in case vps_srls_present_flag is 0, syntax is decoded according to the existing method; in case vps_srls_present_flag is 1, layer dependency is decoded according to the SRLS method.

num_scalable_ref_layer_set represents the number of layer dependency sets (SRLSs).

scalable_ref_layer_set( ) represents the structure of each layer dependency set.

In case vps_srls_present_flag is 0, the decoder decodes syntax according to the existing method, while in case vps_srls_present_flag is 1, the decoder decodes layer dependency according to the SRLS method. The decoder analyzes num_scalable_ref_layer_set and determines the number of layer dependency sets (SRLSs); and figures out the structure of each layer dependency set (SRLS) through scalable_ref_layer_set( ).

Figure 6:
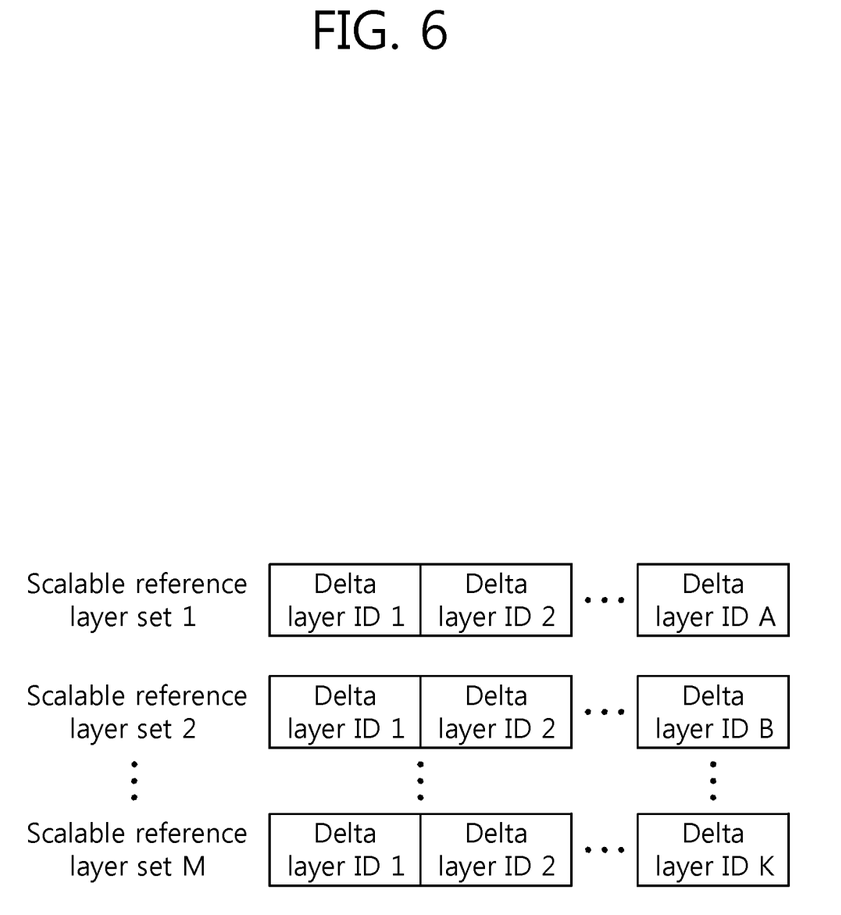
FIG. 6 illustrates a scalable reference layer set according to the present invention.

FIG. 6 illustrates a scalable reference layer set according to the present invention.

With reference to FIG. 6, M scalable reference layer sets can be defined, and each scalable reference layer set can comprise a plurality of layer IDs.

The scalable reference layer set 1 comprises A layer IDs, scalable reference layer set 2 comprises B layer IDs, and scalable reference layer set M comprises K layer IDs.

The layer IDs constituting a scalable reference layer set can be specified by a difference between current layer ID and reference layer ID.

To encode scalable_ref_layer_set( ) , the encoder can encode a syntax element informing of the number of reference layers (for example, num_ref_layer), syntax element representing signs of the differences of layer_ids between the current layer and reference layers calculated as many times as the number of reference layers (for example, delta_layer_id_sign), and syntax element representing absolute value of the difference; and transmit the encoded syntax elements.

Table 2 is a syntax table of scalable_ref_layer_set( ) understood by the decoder.

TABLE 2

| scalable_ref_layer_set_ (_idxRps_) { | Descriptor |
|---|---|
|   if( idxRps =_= num_scalable_ref_layer_set_) | |
|     delta_srls_idx_minus1 | ue(v) |
|   num_ref_layer | ue(v) |
|   for(i = 0; i<num_ref_layer; i++){ | |
|     delta_layer_id_sign | u(1) |
|     abs_delta_layer_id_minus1[ i ] | ue(v) |
|   } | |
| } | |

With reference to Table 2, num_ref_layer represents the number of reference layers.

The value of delta_srls_idx_minus1 added by 1 specifies a scalable reference layer set and represents a difference from the previous scalable reference layer set.

delta_layer_id_sign represents a sign of the difference between a current layer and reference layer.

abs_delta_layer_id[i] represents an absolute value of the difference between the current layer and reference layer.

The decoder finds out the number of reference layers constructing a reference layer set through num_ref_layer and obtains differences of layer_ids between the current layer and reference layers through delta_layer_id_sign and abs_delta_layer_id[i] signaled as many times as the number of reference layers.

With reference to Table 3, slice_srls_present_flag is a flag indicating whether not to apply layer dependency to a current slice or whether to apply new layer dependency to the current slice.

num_scalable_ref_layer represents the number of layers referenced by a current slice. scalable_ref_layer[i] represents layer_id of a layer to be referenced or information meant for identifying layers to be referenced.

TABLE 4

| |  |
|---|---|
| if( nuh_layer_id > 0 && !all_ref_layers_active_flag && | |
|     NumDirectRefLayers[ nuh_layer_id ] > 0 ) { | |
|   slice_srls_present_flag | u(1) |
|   if( inter_layer_pred_enabled_flag && NumDirectRefLayers[ nuh_layer_id ] > 1) { | |
|     num_scalable_ref_layer | u(v) |
|     if( NumActiveRefLayerPics != NumDirectRefLayers[ nuh_layer_id ] ) | |
|       for( i = 0; i < NumActiveRefLayersPics; i++ ) | |
|         scalable_ref_layer[i] | u(v) |
|   } | |
| } | |

According to another embodiment of the present invention, layer dependency can be analyzed through individual slices.

In case layer dependency is signaled and determined through a slice, the encoder and decoder may use an existing method such as the one using/changing layer dependency in a current slice, where the layer dependency is analyzed in a VPS extension or a method for using/changing layer dependency in the current slice, where the layer dependency in a VPS extension is represented in the form of an SRLS.

First, in case layer dependency is used and changed in a current slice, where the layer dependency in the VPS extension is analyzed according to the existing method, the encoder can determine whether not to use layer dependency for the current slice or whether to apply new layer dependency to the current slice; and can perform encoding of such information for each slice by using a flag (for example, slice_srls_present_flag).

In case a method for applying new layer dependency to a current slice is used, the encoder can encode the number of layers that can be referenced by the current slice into syntax information (for example, num_scalable_ref_layer) and transmits the syntax information; and encode as many reference layers as the number of layers that can be referenced into syntax information (for example, scalable_ref_layer[i]) and transmits the syntax information. The new layer dependency can be applied within the range of inter-layer dependency established in the VPS extension.

Meanwhile a syntax table as shown in Table 3 can be decoded if layer dependency is used and changed in a current slice, where the layer dependency is analyzed in a VPS extension according to the existing method.

TABLE 3

| | Descriptor |
|---|---|
| slice_segment_header( ) { | |
|   ... | |
|   if( nuh_layer_id > 0 ) { | |
|     slice_srls_present_flag | u(1) |
|     if( slice_srls_present_flag ) | |
|       num_scalable_ref_layer | u(v) |
|       for( i = 0; i < NumActiveRefLayerPics; i++ ) | |
|         Scalable_ref_layer[ i ] | u(v) |
|     } | |
|   } | |
|   ... | |
|   byte_alignment( ) | |
| 1 | |

Table 4 is an embodiment of the syntax of Table 3. With reference to Table 4, slice_srls_present_flag is a flag indicating whether not to apply layer dependency to a current slice or whether to apply new layer dependency to the current slice. For example, if slice_srls_present_flag is 1, it indicates that new layer dependency is applied to the current slice, whereas, if slice_srls_present_flag is 0, it indicates that layer dependency is not applied to the current slice. If slice_srls_present_flag is 0, num_scalable_ref_layer is set to 0, and the current slice does not use an inter-layer reference.

slice_srls_present_flag can be analyzed when the following conditions are all met: a layer to be encoded currently is not the base layer; inter-layer dependency established in the VPS extension is not used at all; and with inter-layer dependency established in the VPS extension, the number of layers that can be referenced by the current layer is one or more.

num_scalable_ref_layer represents the number of layers to be referenced by a current slice. num_scalable_ref_layer can be analyzed when slice_srls_present_flag is 1, and the number of layers that can be referenced from inter-layer dependency established in the VPS extension is two or more. num_scalable_ref_layer can have a value larger than 1 and smaller than the number of layers that can be referenced by a current layer from inter-layer dependency established in the VPS extension. In case the number of layers that can be referenced by the current layer from inter-layer dependency established in the VPS extension is 1, num_scalable_ref_layer is set to 1 without analyzing thereof.

scalable_ref_layer[i] represents layer_id of a layer to be referenced or information with which a layer to be referenced can be identified. If the number of layers that can be referenced by a current layer from inter-layer dependency in the VPS extension is the same as num_scalable_ref_layer, scalable_ref_layer[i] is set as information with which a reference layer, specified by inter-layer dependency established in the VPS extension without analyzing scalable_ref_layer[i].

The decoder analyzes slice_srls_present_flag, and If slice_srls_present_flag is 1, new layer dependency is established in a current slice whereas, if slice_srls_present_flag is 0, layer dependency is not defined.

In case new layer dependency signaled from a current slice is used, the decoder can find out the number of layers that can be referenced by the current slice by decoding num_scalable_ref_layer, and obtain layer_id of a layer to be referenced or information with which a layer to be referenced can be identified by decoding scalable_ref_layer[i] as many times as the number of layers to be referenced by the current slice.

Meanwhile, one example of syntax illustrated in Table 5 can be signaled in case a method for using/changing layer dependency in a current slice is employed by using the layer dependency in the VPS extension represented in the form of an SRLS.

TABLE 5

| slice_segment_header( ) { | Descriptor |
|---|---|
| ... | |
| if( !IdrPicFlag ) { | |
|   pic_order_cnt_lsb | u(v) |
|   short_term_ref_pic_set_sps_flag ) | u(1) |
|   if( !short_term_ref_pic_set_sps_flag ) | |
|     short_term_ref_pic_set( num_short_term_ref_pic_sets ) | |
|   else | |
|     short_term_ref_pic_set_idx | u(v) |
|   scalable_ref_layer_set_vps_flag | u(1) |
|   if(vps_srls_present_flag) { | |
|     if(!scalable_ref_layer_set_vps_flag) | |
|       scalable_ref_layer_set ( num_scalable_ref_layer_set) | |
|     else | |
|       scalable_ref_layer_set_Idx | u(v) |
| } | |
|   else { | |
|     if (!scalable_ref_layer_set_vps_flag) { | |
|       num_scalable_ref_layer | u(3) |
|       for( i = 0; i<num_scalable_ref_layer ;i++) | |
|         Scalable_ref_layer[i] | u(6) |
|       } | |
|     } | |
|     ... | |
|   } | |
|   ... | |
| } | |

The decoder encodes the flag, scalable_ref_layer_set_vps_flag and signals whether to use layer dependency established in the VPS extension or whether to introduce new layer dependency to the current slice.

At this time, the encoder can decide according to the flag (vps_srls_present_flag) signaled from the VPS extension whether a method for encoding layer dependency using an SRLS has been used or whether an existing method for encoding layer dependency has been used.

The encoder can encode new layer dependency in a current slice according to scalable_ref_layer_set_vps_flag or can encode syntax information (scalable_ref_layer_set_Idx) informing of which layer dependency set to use from among layer dependency sets established in the VPS extension.

If an existing method for encoding layer dependency has been used in the VPS extension, layer dependency to be used in a current slice according to scalable_ref_layer_set_vps_flag can be defined in the same way as the method to be described later (for example, a method for fixing the layer_id of the base view to '0').

Again referring to FIG. 5, after layer dependency is analyzed, the encoder and decoder analyze layer IDs and view order according to the movement of a base view S520.

A method for analyzing layer IDs according to the movement of a base view can include a method for fixing the layer_id of the base view to '0' and a method for changing the layer_id of the base view according to the base view.

First, a method for fixing the layer_id of the base view to '0' will be described. According to the present invention, to fix the layer_id of the base view to '0', the encoder and decoder can use an existing method for representing layer dependency or a method for representing layer dependency by using an SRLS.

In case an existing method for representing layer dependency is used, the encoder can encode syntax information meant for movement of the base view by preparing base_view_change( ) part in an SEI message.

To define layer dependency again in accordance with movement of the base view, the encoder can encode active_vps_id and change layer dependency on the basis of the information of a target VPS extension.

And by encoding active_sps_id, the encoder can change the view order on the basis of a target sequence parameter set.

If the view order is changed on the basis of the sequence parameter set, the total number of layers can be known through the VPS extension, and syntax elements (layer_id[i]) can be encoded newly for the whole layers and layer IDs can be reconfigured.

Also, a syntax element for each view ID (view_id[i]) can be encoded, and layer ID and view ID can be reconfigured for each layer.

Next, the encoder can change layer dependency by using a syntax element view_dependency_change( ).

Since the encoder can know the total number of views through an SPS (Sequence Parameter Set), the encoder can encode as many syntax elements (view order_Idx[i]) as the total number of views and reconfigure the view order.

Meanwhile, in case an existing method for representing layer dependency is used, the decoder can obtain information meant for moving a base view by parsing and analyzing base_view_change( ) signaled being included in an SEI message.

First, to activate a parameter set meant for moving a base view, the decoder decodes a video parameter set; and active_vps_id and active_sps_id meant for activation of the sequence parameter set. Based on the information included in the decoded active_vps_id and active_sps_id, information meant for moving the base view is determined.

Next, the decoder analyzes layer_id[i] and view_id[i] by using as many corresponding IDs as the number of total layers and assigns new layer_id and view_id to each layer.

Since the layer_id of the base view is always set to '0', the new layer_id and view_id need to represent the change of the base view.

Next, the decoder analyzes a syntax element view_dependency_change( ) and decides change of layer dependency.

The decoder analyzes view_order_Idx[i] by using as many corresponding IDs as the total number of views and reconfigures a decoding order of the views.

Table 6 is a syntax table used for a method for fixing layer_id of the base view to '0' by using the existing representation of layer dependency.

Table 6 is a syntax table used for a method for fixing layer id of the base view to '0' by using the existing representation of layer dependency.

TABLE 6

| base_view_change( payloadSize ) { | Descriptor |
|---|---|
|   active_vps_id | u(4) |
|   active_sps_id | ue(v) |
| // layer specific information | |
|   for( i = 0; i <= vps_max_layers_minus1 ; i++) { | |
|     layer_id[i] | u(6) |
|     view_id[i] | u(v) |

TABLE 6-continued

```
}
view dependency change( )
for( i = 0; i <= num_views_minus1; i++)
    view_order_idx[i]                              se(v)
}
```

According to another embodiment of the present invention, the layer_id of the base view can be fixed to '0' by using representation of layer dependency based on an SRLS.

Table 7 shows a syntax structure signaled to this purpose.

TABLE 7

| base_view_change( payloadSize ) { | Descriptor |
|---|---|
| active_vps_id | u(4) |
| active_sps_id | ue(v) |
| // layer specific information | |
| for( i = 0; i <= vps_max_layers_minus1 ; i++ ) { | |
| layer_id[i] | u(6) |
| view_id[i] | u(v) |
| } | |
| for( i = 0; i <= num_views_minus1 ; i++) | |
| view_order_idx[i] | se(v) |
| } | |

The encoder can encode a syntax element meant for moving the base view by incorporating the base_view_change( ) part into the SEI message.

The encoder, to define layer dependency again in accordance with the movement of the base view, encodes active_vps_id and changes layer dependency on the basis of the information of a target VPS extension.

And the encoder encodes active_sps_id and changes the view order on the basis of the target sequence parameter set.

Next, the encoder checks the total number of layers from the activated VPS extension; and encodes a syntax element (layer_id[i]) meant for identifying the whole layer and reconfigures the layer ID again for each individual layer.

And the encoder can reconfigure the layer ID and view ID for each layer by encoding the syntax element (view_id[i]) meant for view ID.

Afterwards, the encoder can reconfigure the view order by encoding as many syntax elements (view_order_Idx[i]) as the total number of views determined from the activated SPS.

In response to the reconfigured view order, the decoder can obtain information meant for moving the base view by analyzing base_view_change( ) signaled being included in the SEI message.

First of all, the decoder decodes active_vps_id and active_sps_id meant for activation of a video parameter set and sequence parameter set to activate a parameter set intended for moving the base view. Based on the information included in the decoded active_vps_id and active_sps_id, information for movement of the base view is determined.

Next, the decoder analyzes layer_id[i] and view_id[i] by using as many corresponding IDs as the total number of layers and assigns new layer IDs and view IDs to the respective layers.

Since the layer_id of the base view is always set to '0', the new layer_id and view_id need to represent the change of the base view.

Next, the decoder, by analyzing view_order_Idx[i] by using as many corresponding IDs as the total number of views, can reconfigure a decoding order of the views.

In what follows, among the methods for analyzing layer IDs in accordance with movement of a base view, described will be a method for changing the layer ID of the base view according to the view of the base view. Two different embodiments can be applied to implement the method for changing layer ID of the base view according to the view of the base view.

To change the layer ID of the base view according to the view of the base view, the encoder and decoder can use the existing representation for layer dependency or representation of layer dependency using an SRLS.

Table 8 shows syntax elements signaled to use the existing representation for layer dependency.

TABLE 8

| base_view_change( payloadSize ) { | Descriptor |
|---|---|
| active_vps_id | u(4) |
| active_sps_id | ue(v) |
| base_layer_id | u(6) |
| for( i = 0; i <= vps_max_layers_minus1; i++) { | |
| if(layer_id[i] != base_layer_id) { | |
| for(j = 0; j < num_direct_ref_layers[ i ]; j++) | |
| ref_layer_disable_flag[ i ][j ] | u(1) |
| } | |
| } | |
| for( i = 0; i <= num_views_minus1; i++) | |
| view_order_idx[i] | se(v) |
| temporary_ref_layer_id | u(6) |
| } | |

In what follows, a process for the encoder to encode syntax elements will be described with reference to Table 8.

The encoder can encode syntax elements meant for moving the base view by incorporating the base_view_change( ) into the SEI message.

To define layer dependency again in accordance with movement of the base view, the encoder encodes active_vps_id and changes layer dependency on the basis of the information of a target VPS extension.

And by encoding active_sps_id, the encoder changes the view order on the basis of a target sequence parameter set.

The encoder encodes the syntax element base_layer_id to signal the layer_id of the changed base layer.

Afterwards, the encoder reconfigures layer dependency for each of the remaining layers except for those with a layer ID encoded as base_layer_id among the whole layers. To this end, the encoder encode the syntax element ref_layer_disable_flag[i][j] meant for reconfiguring layer dependency.

Next, the encoder determines the total number of layers from the activated VPS extension and encodes as many syntax elements (view_order_Idx[i]) related to the view order as the total number of views and reconfigures the view order.

Since the layer ID of the base layer has been changed, the changed base layer should be able to reference the previous base layer for a predetermined time period (for example, until dependency on the previous GOP is gone). To this purpose, the encoder encodes a syntax element (temporary_ref_layer_id) representing the layer ID of a layer that can be referenced by the base layer for a predetermined time period.

Meanwhile, syntax elements as shown in Table 8 are signaled, the decoder can change the layer ID of the base view by parsing syntax elements as shown below.

The decoder can obtain information meant for moving the base view by analyzing base_view_change( ) signaled being included in the SEI message.

First of all, the decoder decodes active_vps_id and active_sps_id meant for activation of a video parameter set and sequence parameter set to activate a parameter set intended for moving the base view. Based on the information included in the decoded active_vps_id and active_sps_id, information for movement of the base view is determined.

Next, the decoder determines the base layer by parsing base_layer_id. And to determine layer dependency of the remaining layers except for the moved base layer among the whole layers, the decoder parses ref_layer_disable_flag[i][j] representing layer dependency.

Next, the decoder determines the decoding order of views by parsing view_order_idx[i] representing the decoding order of the whole views.

And the decoder can determine a reference layer of the base layer by analyzing temporary_ref_layer_id which can be referenced by the base layer for a predetermined time period.

According to a yet another embodiment of the present invention, layer_id of the base view can be changed according to the view of the base view by using representation of layer dependency based on an SRLS.

Table 9 shows syntax elements signaled to use representation of layer dependency based on an SRLS.

TABLE 9

| base_view_change( payloadSize ) { | Descriptor |
|---|---|
| active_vps_id | u(4) |
| active_sps_id | ue(v) |
| base_layer_id[i] | u(6) |
| for( i = 0; i <= num_views_minusl ; i++) | |
| view_order_idx[i] | se(v) |
| temporary_ref_layer_id | u(6) |
| } | |

In what follows, a process for the encoder to encode syntax elements will be described with reference to Table 9.

The encoder can encode syntax elements meant for moving the base view by incorporating the base_view_change( ) into the SEI message.

To define layer dependency again in accordance with movement of the base view, the encoder encodes active_vps_id and changes layer dependency on the basis of the information of a target VPS extension.

And by encoding active_sps_id, the encoder changes the view order on the basis of a target sequence parameter set.

The encoder encodes the syntax element base_layer_id to signal the layer_id of the changed base layer.

Next, the encoder determines the total number of layers from the activated VPS extension and encodes as many syntax elements (view_order_Idx[i]) related to the view order as the total number of views and reconfigures the view order.

Since the layer ID of the base layer has been changed, the changed base layer should be able to reference the previous base layer for a predetermined time period (for example, until dependency on the previous GOP is gone). To this purpose, the encoder encodes a syntax element (temporary_ref_layer_id) representing the layer ID of a layer that can be referenced by the base layer for a predetermined time period.

Meanwhile, syntax elements as shown in Table 9 are signaled, the decoder can change the layer ID of the base view by parsing syntax elements as shown below.

The decoder can obtain information meant for moving the base view by analyzing base_view_change( ) signaled being included in the SEI message.

First of all, the decoder decodes active_vps_id and active_sps_id meant for activation of a video parameter set and sequence parameter set to activate a parameter set intended for moving the base view. Based on the information included in the decoded active_vps_id and active_sps_id, information for movement of the base view is determined.

Next, the decoder determines the base layer by parsing base_layer_id.

Next, the decoder determines the decoding order of views by parsing view_order_idx[i] representing the decoding order of the whole views.

And the decoder can determine a reference layer of the base layer by analyzing temporary_ref_layer_id which can be referenced by the base layer for a predetermined time period.

Afterwards, the encoder and decoder can refer to reference pictures by constructing a reference picture list S530.

Dependency between inter-layer reference pictures can be determined from inter-layer dependency information specified in the VPS extension or slice header.

The method specified in the step of S510 can analyze layer dependency by using the VPS extension and slice header.

Figure 7:
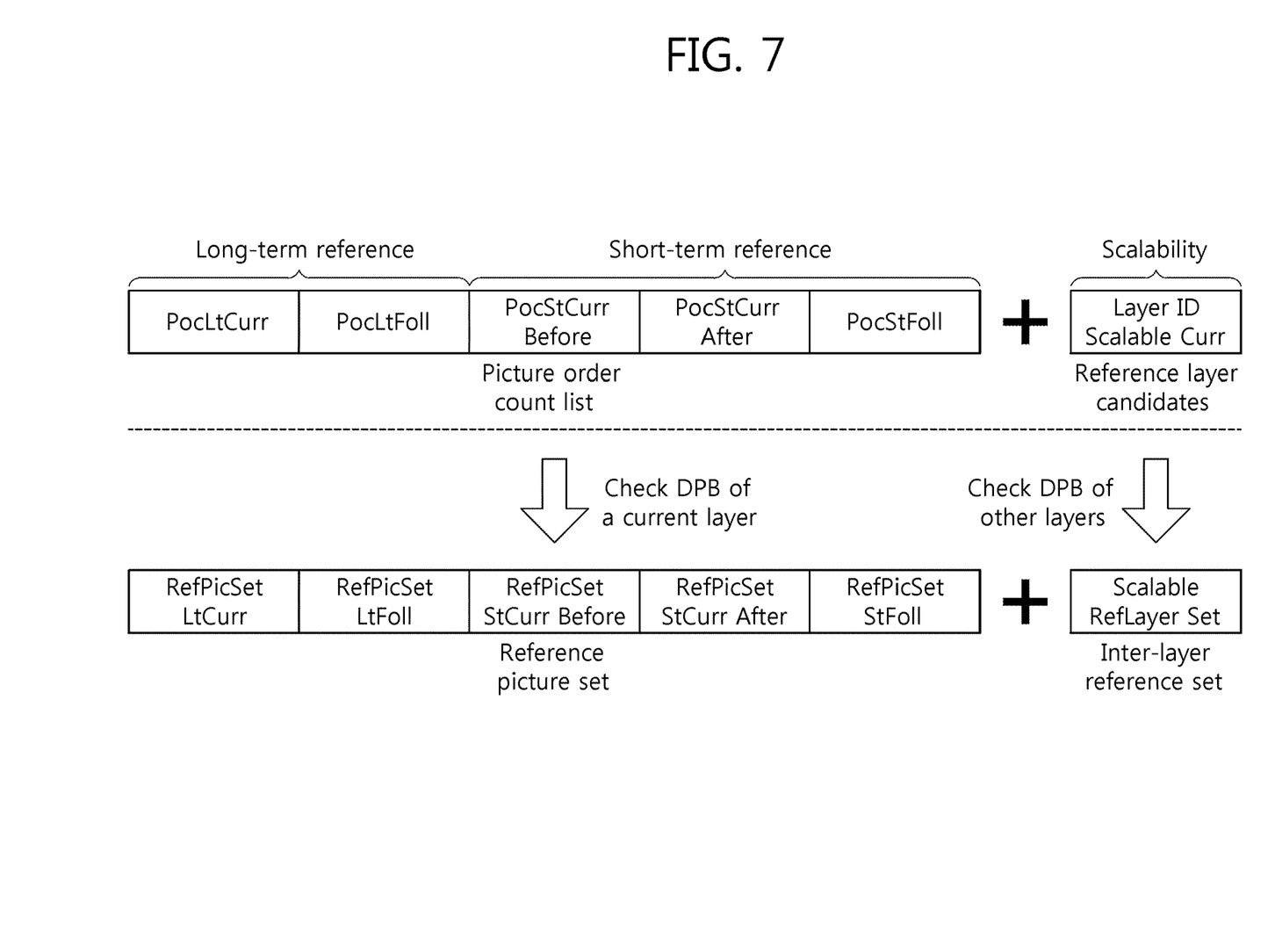
FIG. 7 illustrates a process of deriving a reference picture set according to the present invention.

After each layer analyzes layers to be referenced, the encoder and decoder can add ScalableRefLayerSet as shown in FIG. 7 to a reference picture list at the time of constructing thereof.

FIG. 7 illustrates a process of deriving a reference picture set according to the present invention.

As shown in FIG. 7, to derive a reference picture set included in a current layer before decoding a current picture, five lists consisting of POC (Picture Order Count) values and one list used for inter-layer prediction can be constructed.

The five lists are PocLtCurr, PocLtFoll, PocStCurrBefore, PocStCurrAfter, and PocStFoll. The individual lists include as many constituting elements (namely, POC values) as specified by NumPocStCurrBefore, NumPocStCurrAfter, NumPocStFoll, NumPocLtCurr, and NumPocLtFoll.

PocLtCurr is a list used by a current picture and includes POC of a long-term reference picture, which is larger than the POC of the current picture; PocLtFoll is a list including the POC of a long-term reference picture not used by the current picture. PocLtCurr and PocLtFoll are used for constructing a long-term reference picture set.

PocStCurrBefore is a list used by a current picture and includes POC of a short-term reference picture, which is smaller than the POC of the current picture. PocStCurrAfter is a list used by the current picture and includes POC of a short-term reference picture, which is larger than the POC of the current picture. PocStFoll is a list including POC of a short-term reference picture not used by the current picture. PocStCurrBefore, PocStCurrAfter, and PocStFoll are used to construct a short-term reference picture set.

The encoder and decoder can generate a list (LayerID-ScalableCurr) consisting of layer IDs for reference layer candidates comprising other layers supporting scalability. LayerIDScalableCurr is used to construct a scalable reference layer set, namely inter-layer reference layer set or inter-view reference layer set.

The encoder or decoder can derive five reference picture sets from the five POC lists by checking the decoded picture buffer (DPB) which stores decoded pictures with respect to a current layer and construct a reference layer set (ScalableRefLayerSet) to be used for inter-view prediction from the LayerIDScalableCurr by checking the DPBs of other layers.

The scalable reference layer set (ScalableRefLayerSet) can be constructed by using as many reference layers as the number of reference layers signaled from the VPS extension or slice header.

In the scalable reference layer set (ScalableRefLayerSet), an picture having the same POC as the current picture can be designated by a reference layer having dependency signaled from the VPS extension or slice header.

The pictures constituting the scalable reference layer set (ScalableRefLayerSet) are all indicated as being used for long-term reference.

The encoder and decoder can derive a reference picture list on the basis of the reference picture set and inter-layer reference layer set; and perform prediction of pictures by using the reference picture list.

As described above, in case the base view moves to another view in a multi-view video, for more efficient encoding and decoding, the present invention determines layer dependency by using layer dependency information that can be signaled from a video parameter set or slice; and provides a method for determining a view order in accordance with movement of the base view and an apparatus using the method.

The present invention provides a method for the user to decode the view intended by a producer in a more cost-effective way than existing methods in case the view is moved in a live broadcasting program according to the producer's intention and an apparatus using the method.

In the embodiments described above, although methods have been described through a series of steps or a block diagram, the present invention is not limited to the order of steps and some step can be carried out in a different order and as a different step from what has been described above, or some step can be carried out simultaneously with other steps. Also, it should be understood by those skilled in the art that those steps described in the flow diagram are not exclusive; other steps can be incorporated to those steps; or one or more steps of the flow diagram can be removed without affecting the technical scope of the present invention.

The embodiments above include examples of various aspects. Though it is not possible to describe all of the possible combinations to illustrate various aspects, it should be understood by those skilled in the art that other combinations are possible. Therefore, it should be understood that the present invention includes all of the other substitutions, modifications, and changes belonging to the technical scope defined by appended claims.

What is claimed is:

1. A method for video decoding that supports multi-layer videos, the method comprising:
analyzing a first layer dependency on a current layer based on a video parameter set (VPS) extension;
analyzing a second layer dependency on a current slice in the current layer based on information encoded in a slice unit, wherein the analyzing the second layer dependency on the current slice comprises determining, for the current slice, whether to use the first layer dependency of the VPS extension or the second layer dependency of the slice unit;
constructing a reference picture list for the current slice based on either one or both of the first layer dependency on the current layer and the second layer dependency on the current slice;
predicting a current block included in the current slice by using at least one reference picture included in the reference picture list to generate a prediction block;
generating a residual block of the current block; and
reconstructing the current block by using the prediction block and the residual block,
wherein the reference picture list comprises a temporal reference picture belonging to a same layer as the current slice and an inter-layer reference picture belonging to a different layer from the current slice, and
wherein the inter-layer reference picture has a same picture order count (POC) value as the current slice.

2. The method of claim 1, wherein the analyzing the first layer dependency on the current layer comprises deriving, based on information signaled from the VPS extension, layer dependency set information representing a structure of a layer dependency of the current layer.

3. The method of claim 1, wherein the analyzing the second layer dependency on the current slice comprises:
in response to determining that the second layer dependency of the slice unit is used for the current slice,
analyzing the number of reference layers referenced by the current slice;
analyzing identifying information of a reference layer referenced by the current slice as many times as the number of reference layers referenced by the current slice; and
determining the inter-layer reference picture for the current slice based on the identifying information of a reference layer referenced by the current slice.

4. The method of claim 2, wherein the layer dependency set information comprises information about the number of reference layers referenced by the current layer and layer ID information specifying a layer ID of a reference layer.

5. A method for video encoding that supports multi-layer videos, the method comprising:
encoding a first layer dependency on a current layer into a video parameter set (VPS) extension;
encoding a second layer dependency on a current slice in the current layer into a slice unit, wherein the encoding the second layer dependency on the current slice comprises determining, for the current slice, whether to use the first layer dependency to be encoded into the VPS extension or the second layer dependency to be encoded into the slice unit;
constructing a reference picture list for the current slice based on either one or both of the first layer dependency on the current layer and the second layer dependency on the current slice;
predicting a current block included in the current slice by using at least one reference picture to be included in the reference picture list to generate a prediction block;
generating a residual block of the current block by using the prediction block; and
encoding the residual block,
wherein the reference picture list comprises a temporal reference picture belonging to a same layer as the current slice and an inter-layer reference picture belonging to a different layer from the current slice, and
wherein the inter-layer reference picture has a same picture order count (POC) value as the current slice.

6. The method of claim 5, wherein the encoding the first layer dependency on the current layer comprises determining layer dependency set information representing a structure of a layer dependency of the current layer.

7. The method of claim 5, wherein the encoding the second layer dependency on the current slice comprises:
in response to determining that the second layer dependency to be encoded into the slice unit is used for the current slice, determining one or more inter-layer reference pictures for the current slice;

encoding the number of reference layers referenced by the current slice based on the one or more determined inter-layer reference pictures; and encoding identifying information of a reference layer referenced by the current slice as many times as the number of reference layers referenced by the current slice.

8. The method of claim 6, wherein the layer dependency set information comprises information about the number of reference layers referenced by the current layer and layer ID information specifying a layer ID of a reference layer.

9. A non-transitory computer-readable medium storing a bitstream that is generated by a method for video encoding that supports multi-layer videos, the method comprising:

encoding a first layer dependency on a current layer into a video parameter set (VPS) extension;

encoding a second layer dependency on a current slice in the current layer into a slice unit, wherein the encoding the second layer dependency on the current slice comprises determining, for the current slice, whether to use the first layer dependency to be encoded into the VPS extension or the second layer dependency to be encoded into the slice unit;

constructing a reference picture list for the current slice based on either one or both of the first layer dependency on the current layer and the second layer dependency on the current slice;

predicting a current block included in the current slice by using at least one reference picture to be included in the reference picture list to generate a prediction block;

generate a residual block of the current block by using the prediction block; and encoding the residual block, wherein the reference picture list comprises a temporal reference picture belonging to a same layer as the current slice and an inter-layer reference picture belonging to a different layer from the current slice, and wherein the inter-layer reference picture has a same picture order count (POC) value as the current slice.

* * * * *